(12) United States Patent
Weschke et al.

(10) Patent No.: US 9,228,781 B2
(45) Date of Patent: Jan. 5, 2016

(54) DRYING SYSTEM HAVING A THERMAL ENGINE

(75) Inventors: Juergen Weschke, Weil der Stadt (DE); Dietmar Wieland, Waiblingen (DE); Juergen Jost, Asperg (DE)

(73) Assignee: Duerr Systems GmbH, Bietigheim-Bissingen (DE)

( * ) Notice: Subject to any disclaimer, the term of this patent is extended or adjusted under 35 U.S.C. 154(b) by 715 days.

(21) Appl. No.: 13/558,603

(22) Filed: Jul. 26, 2012

(65) Prior Publication Data

US 2013/0014406 A1 Jan. 17, 2013

Related U.S. Application Data

(63) Continuation-in-part of application No. PCT/EP2011/051094, filed on Jan. 26, 2011.

(30) Foreign Application Priority Data

Jan. 26, 2010 (DE) .......................... 10 2010 001 234

(51) Int. Cl.
*F26B 7/00* (2006.01)
*F26B 23/00* (2006.01)
(Continued)

(52) U.S. Cl.
CPC ............... *F26B 23/001* (2013.01); *F26B 15/14* (2013.01); *F26B 23/022* (2013.01); *F26B 2210/12* (2013.01)

(58) Field of Classification Search
CPC ...... F26B 15/14; F26B 23/022; F26B 23/001; F26B 2210/12; F26B 21/002; F26B 21/02; F26B 23/026; F26B 23/02; B05B 15/1233; B05B 15/1207; B05B 15/1225

USPC ................................................ 34/380, 60, 86
See application file for complete search history.

(56) References Cited

U.S. PATENT DOCUMENTS 3,004,347 A * 10/1961 Dobson ........................... 34/514
3,917,444 A * 11/1975 Carthew ........................... 432/72
(Continued)

FOREIGN PATENT DOCUMENTS

DE 42 28 454 A1 3/1994
DE 689 24 907 T2 5/1996
(Continued)

OTHER PUBLICATIONS

English translation of International Preliminary Report on Patentability of the international searching authority dated Aug. 16, 2012 in international patent application PCT/EP2011/051094 on which the claim of priority is based.

(Continued)

*Primary Examiner* — Kenneth Rinehart
*Assistant Examiner* — Bao D Nguyen
(74) *Attorney, Agent, or Firm* — Walter Ottesen P.A.

(57) ABSTRACT

A system for drying vehicle bodies and/or for controlling the temperature thereof. The system includes a cabin and has a heater for heating hot air for the cabin. The system is equipped with a mechanical energy-consuming device, for example, a generator and/or a fan. The heater contains at least one heat exchanger. The hot exhaust gas of a thermal engine can be supplied to the heat exchanger. The thermal engine is coupled to the mechanical energy-consuming device, for example, the generator, so as to move together. Because of the coupled movement, mechanical energy can be transmitted from the thermal engine to the mechanical energy-consuming device.

13 Claims, 5 Drawing Sheets

(51) Int. Cl.
*F26B 15/14* (2006.01)
*F26B 23/02* (2006.01)

(56) References Cited

U.S. PATENT DOCUMENTS

| | | | | |
|---|---|---|---|---|
| 4,173,924 | A | * | 11/1979 | Bradshaw ............... 454/52 |
| 4,261,707 | A | * | 4/1981 | Bradshaw et al. ......... 95/192 |
| 4,492,085 | A | * | 1/1985 | Stahl et al. ............. 60/649 |
| 4,571,949 | A | * | 2/1986 | Moke ................... 60/655 |
| 4,620,858 | A | * | 11/1986 | Bradshaw et al. ......... 96/242 |
| 5,079,852 | A | * | 1/1992 | Nakayama et al. ......... 34/526 |
| 5,165,969 | A | * | 11/1992 | Barlett et al. ........... 427/483 |
| 5,291,668 | A | * | 3/1994 | Becker et al. ............. 34/86 |
| 5,823,767 | A | * | 10/1998 | Watanabe et al. .......... 432/72 |
| 5,868,562 | A | * | 2/1999 | Watanabe et al. .......... 432/21 |
| 6,418,636 | B1 | * | 7/2002 | Sonner .................. 34/86 |
| 8,650,770 | B1 | * | 2/2014 | Levy ................... 34/454 |
| 2007/0101607 | A1 | * | 5/2007 | Katefidis et al. .......... 34/371 |
| 2007/0199202 | A1 | * | 8/2007 | Solomon-Gunn et al. ..... 34/403 |
| 2009/0029062 | A1 | * | 1/2009 | Bar .................... 427/521 |
| 2011/0132197 | A1 | * | 6/2011 | Nagase et al. ........... 96/111 |

FOREIGN PATENT DOCUMENTS

| | | |
|---|---|---|
| DE | 10 2004 051 975 B3 | 4/2006 |
| DE | 10 2007 051 034 A1 | 5/2009 |
| EP | 0 566 304 A1 | 10/1993 |
| EP | 1 068 802 A2 | 1/2001 |
| EP | 1 302 737 A2 | 4/2003 |

OTHER PUBLICATIONS

International Search Report dated May 3, 2011 of international application PCT/EP 20111051094 on which this application is based.
Search report of the German Patent Office dated Oct. 25, 2010 in German patent application 10 2010 001 234.3 on which the claim of priority is based.

\* cited by examiner

DRYING SYSTEM HAVING A THERMAL ENGINE

CROSS REFERENCE TO RELATED APPLICATIONS

This application is a continuation-in-part application of international patent application PCT/EP 2011/051094, filed Jan. 26, 2011, designating the United States and claiming priority from German application 10 2010 001 234.3, filed Jan. 26, 2010, and the entire content of both applications is incorporated herein by reference.

FIELD OF THE INVENTION

The invention relates to a system for the heating-up of, in particular metallic, workpieces, specifically of vehicle bodies, comprising a cabin, a heating system for heating intake air for the cabin, as well as a consumer of mechanical energy.

BACKGROUND OF THE INVENTION

Such a system is known from EP 1 302 737 B1, which describes a painting or coating plant for vehicle bodies, which include a drying module with a heating-up cabin for drying freshly painted or coated vehicle bodies. To this end, hot air can be circulated in the drying module with the aid of a fan. The circulated hot air is heated in a heat exchanger.

To ensure reliable operation of industrial plants and assembly lines, in particular in the production of automobiles, it is necessary to continuously supply electrical energy to the control and drive systems provided therein. This is not a given in, among others, the so-called developing countries and emerging market countries. There, a failure occasionally occurs in the utilities or power grids for electrical energy. Therefore, the utilities of production facilities are provided with emergency backup generators or systems for storing electrical energy to maintain production even in the case of a breakdown of the power supply voltage.

SUMMARY OF THE INVENTION

It is an object of the invention to provide a system for heating-up components, which can be operated reliably and economically even during a temporary disconnection of the system from a public power grid and/or for which the total system efficiency can be increased or optimized.

This object is achieved with a system as described above in which the heating system comprises at least one heat exchanger charged with hot exhaust gas from a thermal engine, in particular a gas motor or a gas turbine, to remove heat from the hot exhaust gas for the heating to a drying temperature of intake air for the cabin, wherein the thermal engine is movably coupled to the consumer to transfer mechanical energy from the thermal engine to the consumer.

The term "gas" referred to herein is especially a mixture of air and harmful or toxic substances.

The invention is based on the insight that the enthalpy of the exhaust gas of a thermal engine, in particular an internal combustion engine for the exothermal combustion of a gas/air mixture, which is designed to run an electrical generator with several megawatts of power, exhibits a substantial amount of heat in the exhaust gas. According to the invention, the thermal output of the above-mentioned thermal engine during rated operation is preferably set to a value of 1 MW to 8 MW, whereas the installed electrical power of the electrical generator (or of another consumer) is set to about 2 MW to 10 MW. The mentioned thermal output in accordance with the invention is preferably used to heat up 1,500 kg of steel from ambient temperature to a handling or processing temperature between 130° C. and 200° C. The mentioned amount of steel corresponds, for example, to a number of about 30 vehicle bodies made from sheet steel with a weight of about 500 kg each. With a cycle time of about 30 units per hour, the vehicle bodies can be heated up to a (drying) temperature in the range between 130° C. and 200° C. in a cabin using the extractable heat energy of the exhaust gas.

To dry the mentioned vehicle bodies, a total heat power in accordance with the invention is preferably provided in a range between 3.6 MW and 6 MW and is transferred onto the bodies with an overall efficiency of about 0.05 to 0.1.

Against this background, it is a basic principle of the invention to use a thermal engine, in particular a thermal engine in the form of a gas motor or a gas turbine, as a heating system for hot air in a plant for the drying and/or for the maintaining of the temperature of metallic workpieces, in particular bodies. According to the invention, the gas motor is operated with a homogeneously gaseous combustion gas/air mixture, whereby the combustion gas preferably is under standardized conditions gaseous hydrocarbons (e.g. methane, butane, natural gas etc.), which is mixed with fresh air in an optimum ratio. Alternatively, hydrocarbon-containing exhaust gases from corresponding sources of a production facility are drawn off and enriched with fresh air and/or with a combustion gas to achieve a desired mixing composition. Further, a gas motor in accordance with the invention is, in particular, of the four-stroke engine type or of the two-stroke engine type, and which can be operated as a combustion motor according to the Otto principle, the diesel principle or the Seiliger principle. A gas turbine according to the invention can be operated in analogous manner.

The electrical power provided by the electrical generator can then be used to reliably power electrical consumers in a drying plant designed for about 30 body units, such as drive mechanisms for conveying units and fans, but also electrical control devices.

The invention further encompasses that correspondingly less electrical power has to be provided for the consumers when bodies are moved through the plant with a slow cycle time. The drying system according to the invention, therefore, provides for the drying of vehicle bodies with a tremendously high efficiency. Moreover, the generator of the system may be used to provide electrical energy to other electrical loads of a production facility, such as control devices and drive mechanisms of a painting or coating plant.

A particularly efficient heat transfer of the heat from the exhaust gas of the gas turbine to the hot air of the cabin is possible when the heat exchanger is coupled to at least one heat transfer fluid loop, which comprises at least one further heat exchanger to heat up the intake air for the drying cabin.

Preferably, the heat transfer fluid loop comprises a heater device and/or a heat reservoir for heating the heat transfer fluid during the start-up phase of the gas turbine. Thereby, a fast start-up of the system is made possible. In accordance with the invention, the heat transfer fluid loop in particular utilizes water, a salt solution, or a heat-transfer oil for circulation, wherein the heat transfer medium can act at least temporarily as an efficient heat storage medium. Preferred are aqueous solutions of potassium carbonate or calcium chloride or diesel oil, rape oil, or silicon oils (e.g. polymeric phenyl-siloxanes).

Moreover, it is advantageous if the heat exchanger is connected to a further heat transfer fluid loop to provide heat to at least one heat sink operating in a low-temperature range. This further heat transfer fluid loop is also preferably a water loop, a brine loop, or a heat transfer oil loop. In an optimized embodiment, the (first) heat transfer fluid loop and the second heat transfer fluid loop comprise different heat transfer fluids, which are adapted to the respective conditions. As a result, particularly efficient operation of the plant is made possible. It is further advantageous for the energy balance of the plant when the latter comprises a heat transfer fluid loop with a heat exchanger for heating up the fresh air provided to the drying cabin.

In a plant in accordance with the invention, heat can be extracted, in particular, directly from the hot exhaust gas of the thermal engine in a heat exchanger, which heats up the intake air for the cabin, which is in the form of a drying cabin for example, and delivers it to the cabin without further treatment. In this case, it is advantageous to provide several heat exchangers, which are supplied with the hot exhaust gas in the form of a cascade and transfer the heat to the intake air for the cabin. The exhaust gas of the thermal engine flowing through the heat exchanger can further be provided to one or more further heat exchangers for the heating-up of fresh air to the cabin. Moreover, the heat from the exhaust gas of the gas turbine can be used to provide heat to a heat sink operating in a low-temperature range. To this end, exhaust gas from the gas turbine is directed to one or more further heat exchangers for the transfer of heat from the exhaust gas to a heat transfer fluid loop, for example, a heat transfer fluid loop with water as the heat transfer fluid. To ensure a sufficient exhaust gas flow, it is advantageous if the exhaust gas from the thermal engine is supplied to this at least one further heat exchanger via a fan.

An environmentally friendly and a simultaneously energy-efficient operation of the plant can be achieved by connecting the cabin with a purification reactor for the thermal regenerative oxidation of solvent-containing exhaust gas. The purification reactor receives the exhaust gas via an exhaust gas line from the cabin. At the same time, the purification reactor is connected to a heat exchanger for the transfer of heat onto a heat transfer fluid loop, which is preferably a hot water loop. With this heat transfer fluid loop, one or more heat sinks working in a low-temperature range can be provided with heat, for example one or more heat exchangers for heating up fresh air supplied to the cabin.

In a particularly preferred embodiment of the plant, a heat reservoir for storing the heat from the exhaust gas of the thermal engine is provided. Preferably, this heat reservoir is provided in a bypass conduit, which bypasses a conduit segment for the provision of exhaust gas to one heat exchanger of the plant. Moreover, it is advantageous to provide the generator of the plant with a buffer (an accumulator amongst other things), for the buffering of electrical energy. This allows providing power to the control devices and drives of the plant without simultaneously heating hot air for the drying cabin.

By feeding the thermal engine with solvent-containing, hydrocarbon-enriched exhaust gas from the cabin as combustion gas, this exhaust gas can be disposed of by incineration and simultaneously used for energy production. In principle, the thermal engine can be operated with exhaust gas from a spray booth of a painting plant. Notably, the system for heating-up can also comprise several decentrally arranged thermal engines, which can power one or more consumers of mechanical energy, such as fans, generator or even compressors. The plant in accordance with the invention is particularly suited for a painting plant for motor vehicles or motor vehicle components.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
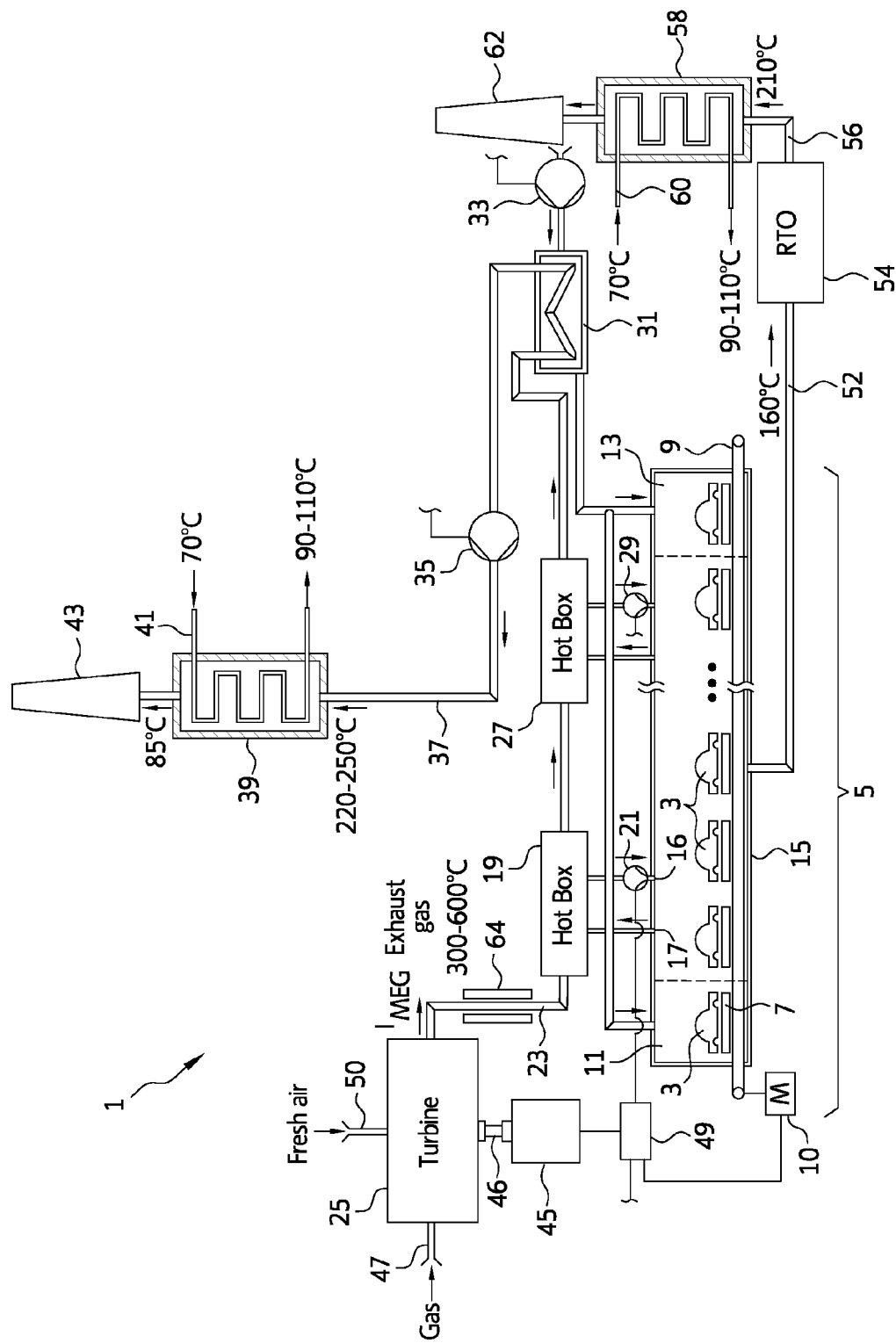
FIG. 1 shows a first system for drying vehicle bodies with a thermal engine.

The system 1 shown in FIG. 1 for drying workpieces is designed in particular for vehicle bodies 3 (or parts thereof) and comprises a cabin that is formed as a drying tunnel 5 or as a drying cabin. The drying tunnel 5 has a substantial heat demand, such that sensible heat has to be transferred to the drying tunnel from the outside at a given, with respect to the ambient conditions significantly increased, temperature level. The invention is therefore described using a plant for drying vehicle bodies as an example. In modified exemplary embodiments, a system in accordance with the invention is provided as a plant for tempering, drying, hardening and/or irradiating, but in particular for the heating-up of large metallic workpieces. Other suitable workpieces, besides vehicle bodies (or parts thereof), are large-volume systems with comparably large heat capacities, which undergo a treatment having an increased heat demand. In accordance with the teachings of the invention, the so-called dryer, the so-called drying cabin or the drying tunnel can be used for any tasks with a heat demand without deviating from the teachings in accordance with the invention.

Vehicle bodies 3, which are mounted onto skids 7, are transported through drying tunnel 5 with the aid of conveying device 9. During that process, mechanical energy is consumed. Conveying device 9 has an electrical drive train 10. The drive train 10 is an electrical energy consumer within the system 1. The drying tunnel 5 has an intake lock 11 and an exit lock 13. The drying tunnel includes a drying section 15, which is located between intake lock 11 and exit lock 13. The drying section 15 is preferably arranged in such a way that about 15 freshly painted and/or solvent-containing substrate-coated vehicle bodies 3 can be dried more or less simultaneously. To this end, the drying section 15 is dimensioned, for example, with a length L=40 m, an internal width b of 1.40 m<b<1.60 m and a headroom h of 2.60 m<h<2.00 m. In a particularly preferred embodiment, a cycle time distance of 5.2 m, thirty units per hour, and a 0.5 hour residence time result in a tunnel length of 78 m (outer width b: 3 m to 4.6 m, outside height h: 2.8 m to 3.3 m).

To dry a vehicle body that is freshly coated with paint and/or a substrate, drying must take place, depending on the kind of the paint or substrate, for about 30 minutes at a temperature T, which is in the range between 130° C.<T<200° C., usually between 140° C.<T<175° C. The drying temperature for cathodic electrodeposition painting is, for example, 180° C., for filler painting 160° C., and for a thick resist 140° C. The required heat amount for drying a vehicle body is determined by the heat amount that has to be transferred to a steel sheet of a vehicle body during a heating-up period of 15 minutes, to bring the steel sheet to the drying temperature. Because the weight of the steel sheet utilized for a vehicle body is usually of the order of 500 kg, the heat amount required for drying paint or a substrate on a freshly coated vehicle body is about 36 MJ. For the drying and/or cross-linking of common paints, a retaining period of 15 minutes at the drying temperature T is preferably provided following the heating-up time.

In the intake lock 11 and the exit lock 13, the vehicle bodies 3 are transported through a gas atmosphere containing heated fresh air. By contrast, the vehicle bodies 3 in the drying section 15 of the drying tunnel 5 reside in a hot-air atmosphere with recirculated hot air. The temperature of the hot air corresponds in this case to the required drying temperature of a paint and/or a substrate on a vehicle body 3. To ensure a uniform drying temperature for the paint or the substrate on the surface of a vehicle body 3, the hot-air atmosphere is circulated within drying tunnel 5 with a defined flow. To this end, the drying tunnel 5 is provided with intake and exhaust ports (16, 17), which are connected with a heat exchanger 19, for inlet air in the form of hot air. The intake ports 16 in the drying tunnel are preferably provided with jets in a heating-up region. Further preferred is the provision of intake ports without jets in the contiguous retaining zone.

The heat exchanger 19 is provided with a fan 21, which draws in cooled-down hot air through the heat exchanger 21 via one or more exit ports 17 and recirculates hot air into the drying tunnel 5 via one or more jets 16 in the drying tunnel 5. The heat exchanger 19 is connected to the exhaust gas line 23 of a thermal engine 25. Thermal engine 25 is a gas turbine, for example the gas turbine model SGT-400 from Siemens or the gas turbine model LM 1600 from General Electric. Instead of a gas turbine, however, it is also possible to employ gas motors or also another internal combustion engine in system 1. By way of example, the gas motors of model J616 GS of type series 6 from Jenbacher Gasmotoren are also suitable for use in the system 1.

The thermal engine 25 burns a combustion gas provided via pipe 47. The exhaust gas of the thermal engine 25 generated thereby flows into exhaust gas pipe 23 with a temperature $T_{EG}$, which lies between 300° C. and 600° C., and a mass throughput $I_{MEG}$ of 17 kg/s<$I_{MEG}$<21 kg/s. To achieve a good flow performance for the exhaust gas, the exhaust gas pipe 23 is preferably provided as a hot tube with a pipe diameter of nominal width DN 800.

In the heat exchanger 19, heat from the exhaust gas of thermal engine 25 is transferred to the hot air circulated by fan 21 through the heat exchanger 19 into the drying tunnel 5. From the heat exchanger 19, exhaust gas from the thermal engine 25 is provided to a further heat exchanger 27, which corresponds to heat exchanger 19. In heat exchanger 27, fan 29 is likewise used to heat circulated hot air from the drying section of the drying tunnel 5 to a drying temperature.

It is, of course, possible for the heating up of hot air circulated within the drying tunnel 5 to also provide a multitude of heat exchangers through which exhaust gas from the thermal engine is run.

From the heat exchanger 27, the exhaust gas from the gas turbine 25 flows to a heat exchanger 31 for fresh air. Through this heat exchanger 31, fresh air is sucked in with a fan 33. This heated fresh air is provided to intake lock 11 and exit lock 13 of the drying tunnel. At the exit side of the heat exchanger 31 for fresh air is a further fan 35. With this fan, already cooled-down exhaust gas from the thermal engine 25 is blown under pressure into a hot gas pipe 37 in a heat exchanger formed as a heat recovery boiler 39. In this heat recovery boiler 39, residual heat of the exhaust gas is transferred to a hot water loop 41. Hot water loop 41 serves the purpose of providing heat to further heat sinks, such as a so-called preparation station of a painting plant, a heating system for a factory hall with work stations, or a heating system for intake and exhaust air.

To ensure an advantageous flow of the exhaust gas from the thermal engine 25 through heat recovery boiler 39, a stack 43 is provided thereon. Through this stack 43, cooled-down exhaust gas from the thermal engine 25 is released into the environment.

The drying tunnel 5 is connected via exhaust pipe 52 to purification reactor 54 for the thermal regenerative oxidation of solvent-comprising dryer exhaust gas from the drying tunnel 5. In this purification process, dryer exhaust gas provided to the purification reactor 54 is heated. The purification reactor 54 is connected via gas line 56 to a heat exchanger formed as a heat recovery boiler 58. In the heat recovery boiler, the heat from the discharge air purified in purification reactor 54 is transferred to a hot water loop 60. This hot water loop 60 serves the purpose of providing heat to further heat sinks, which operate at low temperature. Purified exhaust air from the purification reactor 54 flowing through heat recovery boiler 58 is released into the environment through stack 62. This measure ensures a good flow performance for the exhaust gas in the heat recovery boiler 58.

To make possible a fast start-up of drying system 1, a heating device 64, that is preferably fired using fossil fuel, is provided in the exhaust gas line 23 between the thermal engine 25 and the heat exchanger 19.

The thermal engine 25 is supplied with fresh air via connection 50. It operates in good approximation according to the thermodynamic Joule-Thompson Process. The mechanical power of the thermal engine 25 is dimensioned such that with the enthalpy of the exhaust gas preferably up to 30 or even more vehicle bodies per hour can be dried at a drying temperature between 130° C. and 200° C. in the drying tunnel 5. Such a thermal engine can provide a mechanical power of about 12 MW.

The thermal engine 25 is provided with a generator 45. To this end, the thermal engine 25 is movably coupled to the generator 45. Torque provided at a power train of the thermal engine is transferred onto the generator 45 using pivotable shaft 46. During operation of the thermal engine 25, the generator 45 produces electrical energy. The mechanical energy led into the generator 25 using the pivotable shaft 46 is consumed by the generator 45. Like the conveyor 9, the generator 45 is a consumer of mechanical energy in the system 1. The generator 45 is connected to a distributor module 49. Via the distributor module 49, the generator 45 provides electrical energy to the electrical consumers of system 1, such as the electrical drive train 10 of conveyor 9 and the fans (21, 29, 33, 35), and corresponding control units.

Figure 2:
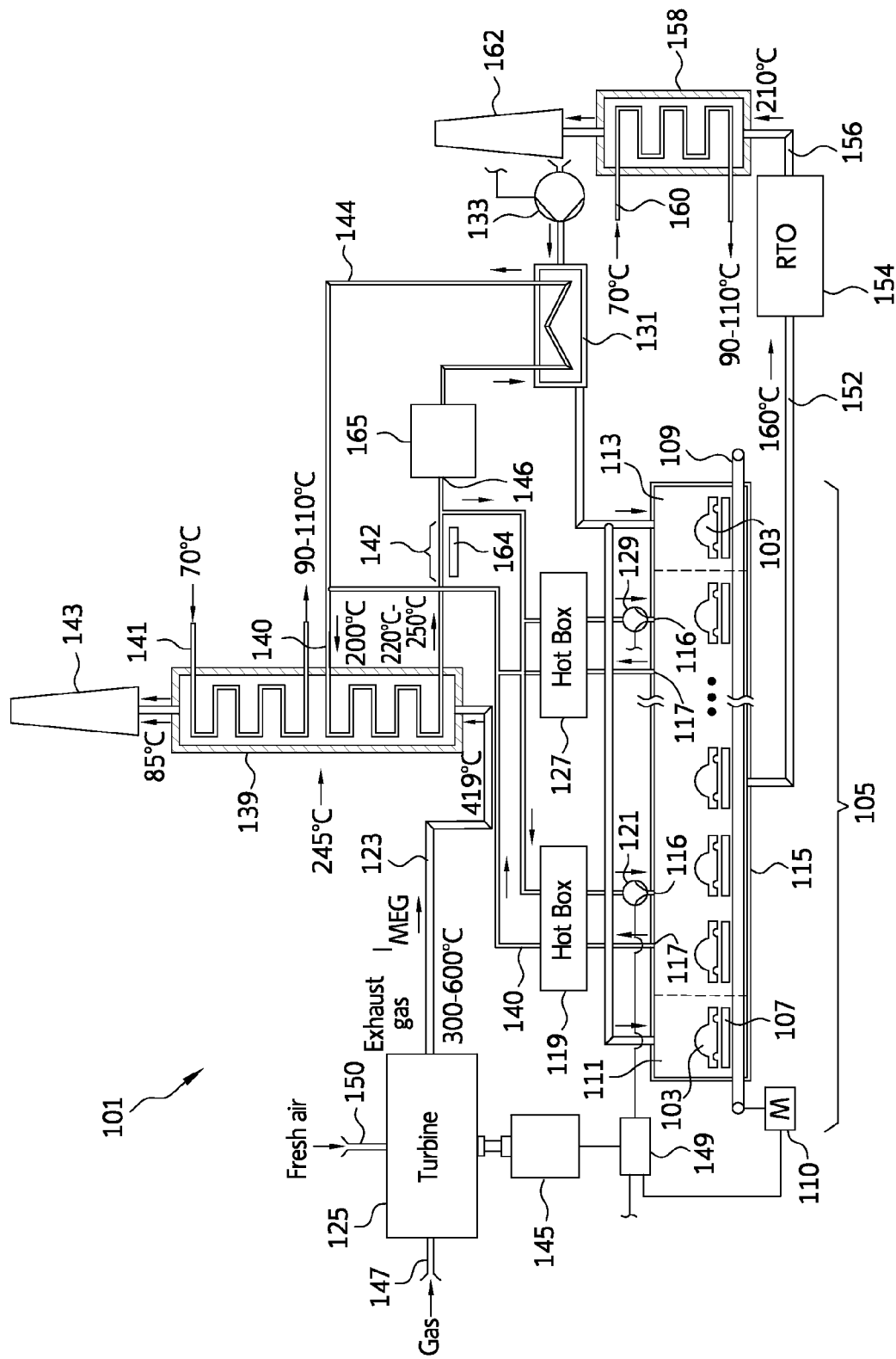
FIG. 2 shows a second system for drying vehicle bodies.

FIG. 2 depicts a system 101 for the drying of vehicle bodies 103 with a drying tunnel 105, which is constructed like the dryer tunnel 5 of system 1 in FIG. 1. Also, the construction of conveyor 109 for the transport of the vehicle bodies 103 on the skids 107 corresponds to the one in system 1. Thus, the conveyor 109 has electrical drive trian 110. For the heating-up of hot air circulated in the drying section 115 of the drying tunnel 105, the system 101 comprises a heat exchanger 119 and a heat exchanger 127. The heat exchangers (119, 127) are provided with corresponding fans (121, 129) to circulate hot air through intake and exit ports (116, 117) within drying tunnel 105.

Contrary to the heat exchangers (19, 27) of system 1 in FIG. 1, heat exchangers (119, 127) are not directly connected to exhaust line 123 of thermal engine 125, but are arranged in loop 140 with a thermal fluid in the form of hot water or a heat transfer oil. Compared to system 1 in FIG. 1, this measure allows installing less hot pipe with a large pipe diameter to heat hot air for the drying tunnel 105 with heat from the exhaust gas of the thermal engine 125 which is supplied with combustion gas via pipe 147 and with fresh air via connection 150. To this end, the heat transfer fluid within the loop 140 transports the heat that was extracted from the exhaust gas of the thermal engine 125, to the heat exchangers (119, 127), where it is transferred to the hot air circulating within dryer 105.

To extract heat from the exhaust gas of thermal engine 125, an exhaust gas line 123 is connected to a heat exchanger, which is provided as heat recovery boiler 139. The heat recovery boiler 139 is provided with a stack 143. In heat recovery boiler 139, heat from the exhaust gas of thermal engine 125 is transferred into loop 140 for hot water.

To make possible a fast start-up of system 101, a heating device 164, that is preferably fired using fossil fuel, is provided in a section 142 of the loop 140. A heat reservoir 165 is provided in the connector section 146 of loop 144. During operation of thermal engine 125, heat is stored in the heat reservoir 165. With this stored heat, fresh air flowing through the heat exchanger 131 can be heated up when the thermal engine 125 is operated only at low power or is at a standstill.

The loop 140 comprises a power branch 144 through which the heat of the exhaust gas of the thermal engine 125 can be transported to a heat exchanger 131. This heat exchanger 131, like the heat exchanger 31 in the system 1, serves the purpose of heating up fresh air that is provided via fan 133 to the intake lock 111 and the exit lock 113 of the drying tunnel 105.

The heat recovery boiler 139 is further connected to the loop 141 for hot water, which, like the loop 41 in the system 1, serves the purpose of providing heat that was extracted from the exhaust gas of gas turbine 25 to further heat sinks in a low-temperature range.

Additionally, the drying tunnel 105 in the system 101 is provided with a purification reactor 154 for the purification of exhaust gas supplied via exhaust pipe 152, which, like the purification reactor 54 of system 1 in FIG. 1, is provided with a heat recovery boiler 158 with a hot water loop 160 and a stack 162. The purification reactor 154 is connected to the heat recovery boiler 158 by gas line 156.

Figure 3:
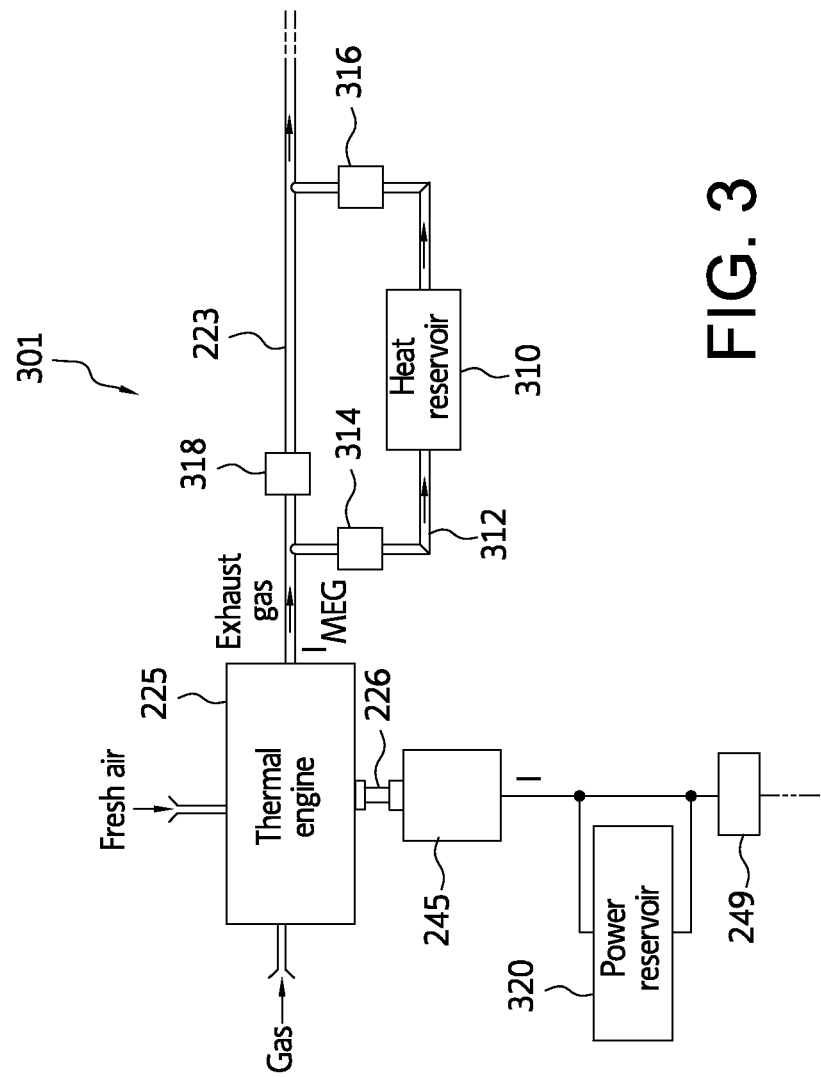
FIG. 3 shows a thermal engine with a generator and a power and heat reservoir in a system for drying vehicle bodies.

The thermal engine 125 of system 101 actuates an electrical generator 145. Using distributor module 149, generator 145 provides, as in system 1 in FIG. 1, electrical energy for the electrical consumers in system 101. FIG. 3 depicts a thermal engine 225 in a system 301 for the drying of vehicle bodies. The thermal engine 225 can be, in particular, provided as a gas turbine or gas motor or else as a Diesel engine. The thermal engine 225 is also movably coupled by a shaft 226 to a generator 245. The thermal engine 225 in the system 301 is provided with reservoir 320 formed as a buffer reservoir for electrical energy and a reservoir 310 for heat. The reservoir 310 for heat is provided in a bypass conduit 312 that is lockable by means of controllable valves (314, 316). The bypass conduit 312 is provided in a section of the exhaust gas conduit 223 of the thermal engine 225 in which a controllable locking valve 318 is arranged. The reservoir 320 for electrical energy is inserted into an electrical bypass conduit 322. The reservoir 320 for electrical energy allows for storing of energy generated from an electrical current I of the generator 245 if it surpasses the demand of the consumers in the system provided via the distributor module 249. Accordingly, the actuation of valves (314, 316, 318) allows for storing, with the reservoir 310, of heat from the exhaust gas of the gas turbine 225, when the amount of heat per time period contained in the exhaust gas exceeds the heat range for the operation of the drying cabin. As for the rest, the construction of the system 301 corresponds to the construction of the system 1 or 101 in FIG. 1 or FIG. 2, respectively.

The combination of a reservoir 310 for heat and a reservoir 320 for electrical energy with the gas turbine 225 depicted in FIG. 3 enables providing a system for the drying of vehicles, as are depicted in FIG. 1 or FIG. 2, with heat and electrical energy, even if the thermal engine provided therein is not in operation.

Figure 4:
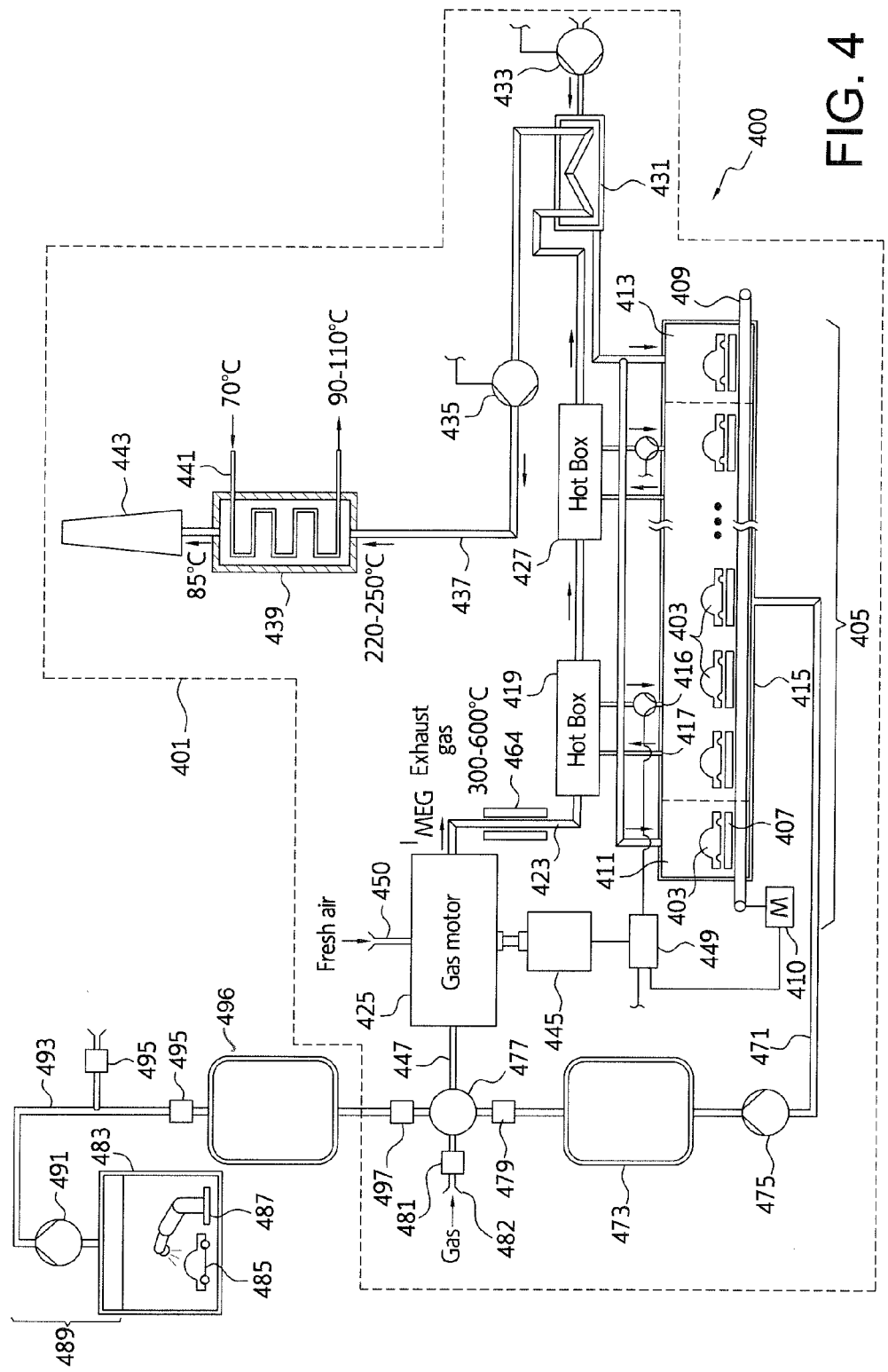
FIG. 4 shows a painting plant with a station for drying vehicle bodies.

The painting plant 400 depicted in FIG. 4 comprises a system 401 for drying vehicle bodies 403 mounted on skids 407 which are transported through the drying tunnel 405 via conveying device 409. The conveying device 409 has a drive train 410. Included in system 401 for the drying of vehicle bodies is a thermal engine 425, which can be operated with the exhaust gas of a drying tunnel 405 as a combustion gas. As far as the construction of the system 401 corresponds to the construction of the system 1 depicted in FIG. 1, those elements in FIG. 4 that correspond to the elements depicted in FIG. 1 are characterized by reference numerals that are increased by the number 400 relative to FIG. 1. Thus, the drying tunnel 405 has an intake lock 411 and an exit lock 413 as well as a drying section 415. The drying tunnel 405 has intake and exhaust ports (416, 417) which are connected to heat exchanger 419. The heat exchanger 419 is connected to the exhaust gas line 423 of a thermal engine 425. The thermal engine 425 burns a combustion gas provided via pipe 447. The thermal engine 425 is provided with a generator 445. To this end, the thermal engine 425 is movably coupled to the generator 445. The generator 445 is connected to a distributor module 449. From the heat exchanger 419, exhaust gas from the thermal engine 425 is provided to a further heat exchanger 427. From the heat exchanger 427, the exhaust gas from the gas turbine 425 flows to heat exchanger 431 for fresh air. Fresh air is drawn in via fan 433 through the heat exchanger 431. A further fan 435 is provided at the exit side of the heat exchanger 431 for fresh air. With this fan 435, already cooled-down exhaust gas from the thermal engine 425 is blown under pressure into a hot gas pipe 437 in a heat exchanger formed as a heat recovery boiler 439. In this heat recovery boiler 439, residual heat of the exhaust gas is transferred to a hot water loop 441. To ensure an advantageous flow of the exhaust gas from the thermal engine 425 through heat recovery boiler 439, a stack 443 is provided thereon. Through this stack 443, cooled-down exhaust gas from the thermal engine 425 is released into the environment. The thermal engine 425 is supplied with fresh air via connection 450 and a heating device 464 is provided in the exhaust line 423 between the thermal engine 425 and the heat exchanger 419.

System 401 includes an exhaust duct 471 through which hydrocarbon-enriched exhaust gas from the drying tunnel 405 can be supplied to the thermal engine 425 as combustion gas. In exhaust duct 471, a gas reservoir 473 is preferably provided. The exhaust gas from the drying tunnel 405 can be injected into gas reservoir 473 with a compressor 475. Within the system 401, a mixing chamber 477 is provided, in which switching of controllable valves (479, 481) of the thermal engine 425 has the effect that fossil combustion gas from a supply source 482 can be mixed with exhaust gas from the drying tunnel 405.

The painting plant 400 comprises a spray booth 483. The spray booth 483 is a painting station. In the spray booth 483, vehicle bodies 485 can be exposed to a spray paint by a painting robot 487. The spray booth 483 has an extraction system 489 for gas comprising a fan 491. Gas that has been sucked out of spray booth 483 can be conducted via a conduit system 493 with valves (495, 497) into mixing chamber 477. A gas reservoir 496 is connected between valves 495 and 497.

Thus, the mixing chamber 477 is operatively connected to the supply source 482 for combustion gas, the spray booth 483 and the drying tunnel 405 for receiving and mixing the combustion gas from the supply source 482, the exhaust gas from the spray booth 483 and/or the exhaust gas from the drying tunnel or cabin 405. This arrangement enables running of the thermal engine 425 alternatively with exhaust gas from the drying tunnel 405, hydrocarbon-containing exhaust gas from the spray booth 483, or with combustion gas which is provided externally of system 401, or with a gas mixture.

The temperature of the exhaust gas flow from the drying cabin is higher than the temperature of the exhaust gas flow from the spray booth. The temperature of the exhaust gas flow from the drying cabin can lie between 60° C. and 250° C. The temperature of the exhaust gas flow from the spray booth can lie between 20° C. and 40° C.

The flow rate of the exhaust gas flow from the drying cabin is lower than the flow rate of the exhaust gas flow from the spray booth. The flow rate of the exhaust gas flow from the drying cabin can lie between 2.000 m$^3$N/h and 20.000 m$^3$N/h. The flow rate of the exhaust gas flow from the spray booth can lie between 50.000 m$^3$N/h and 2.000.000 m$^3$N/h. The unit m$^3$N/h is the standard cubic meter per hour, that is, a volume flow in cubic meters per hour at standard conditions.

Due to thermodynamic efficiency, thermal engines should preferably be supplied with cold combustion gas. Supplying the thermal engine with the hot exhaust gas flow from the drying cabin is therefore not efficient. By mixing the high temperature and low flow rate exhaust gas flow from the drying cabin with the low temperature and high flow rate exhaust gas flow from the spray booth, the temperature of the resulting gas flow allows a much more efficient operation of the thermal engine.

Accordingly, the thermal engine 425 can be provided with hydrocarbon-containing exhaust gas from the spray booth. In the thermal engine 425, these exhaust gases can be incinerated.

Figure 5:
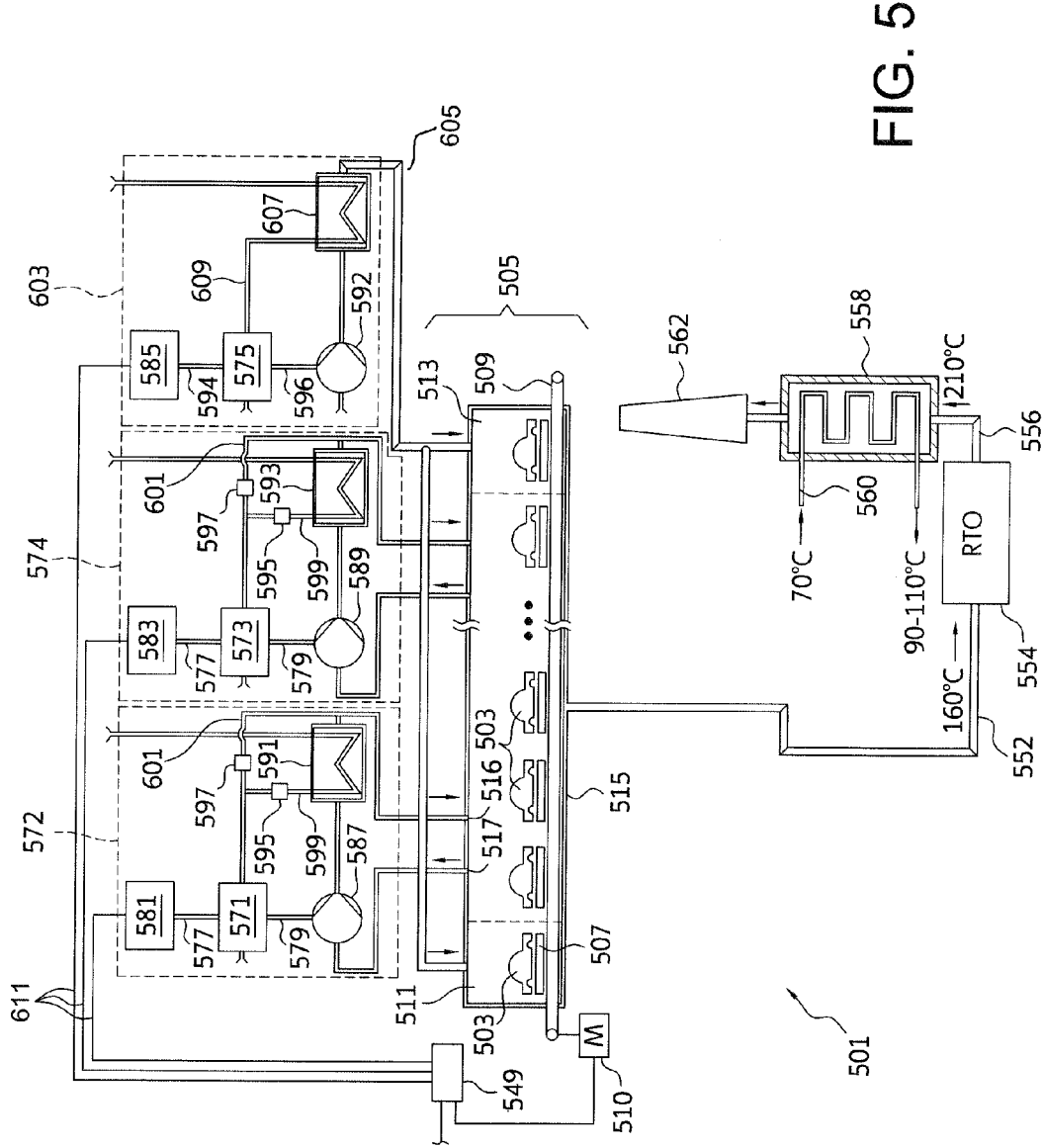
FIG. 5 shows a further system for drying vehicle bodies, which contains several thermal engines.

The system 501 for drying vehicle bodies 503 depicted in FIG. 5 comprises several thermal engines in the form of gas motors (571, 573, 575). The gas motors (571, 573, 575) can be, for example, the gas motor type E 2842 LE 322 or the gas motor type E 2876 TE 302 from MAN. As far as the construction of the system 501 corresponds to the construction of the system 1 depicted in FIG. 1, those elements in FIG. 5 that correspond to the elements depicted in FIG. 1 are characterized by reference numerals that are increased by the number 500 relative to FIG. 1.

Thus, vehicle bodies 503, which are mounted onto skids 507, are transported through drying tunnel 505 with the aid of conveying device 509. During that process, mechanical energy is consumed. Conveying device 509 has an electrical drive train 510. The drive train 510 is an electrical energy consumer within the system 501. The drying tunnel 505 has an intake lock 511 and an exit lock 513. The drying tunnel includes a drying section 515, which is located between intake lock 511 and exit lock 513. The drying section 515 is preferably arranged in such a way that about 515 freshly painted and/or solvent-containing substrate-coated vehicle bodies 503 can be dried more or less simultaneously.

To ensure a uniform drying temperature for the paint or the substrate on the surface of a vehicle body 503, the hot-air atmosphere is circulated within drying tunnel 505 with a defined flow. To this end, the drying tunnel 505 is provided with intake and exhaust ports (516, 517).

The drying tunnel 505 is connected via exhaust pipe 552 to purification reactor 554 for the thermal regenerative oxidation of solvent-comprising dryer exhaust gas from the drying tunnel 505. In this purification process, dryer exhaust gas provided to the purification reactor 554 is heated. The purification reactor 554 is connected via gas line 556 to a heat exchanger formed as a heat recovery boiler 558. In the heat recovery boiler, the heat from the discharge air purified in purification reactor 554 is transferred to a hot water loop 560. This hot water loop 560 serves the purpose of providing heat to further heat sinks, which operate at low temperature. Purified exhaust air from the purification reactor 554 flowing through heat recovery boiler 558 is released into the environment through stack 562. This measure ensures a good flow performance for the exhaust gas in the heat recovery boiler 558.

The thermal engines (571, 573) are provided in separate hot-box modules (572, 574). The thermal engines (571, 573), arranged within the corresponding hot-box modules (572, 574), are mechanically coupled by drive shafts (577, 579) to a generator (581, 583) and to a fan (587, 589), respectively. The fans (587, 589) serve to circulate air in the drying tunnel 505. The fans (587, 589) transport air from the drying tunnel 505 in the hot-box modules (572, 574) through a heat exchanger (591, 593), which is arranged in the proximity of thermal engine (571, 573). Each hot-box module (572, 574) includes two control valves (595, 597). By switching the control valves (595, 597) in the hot-box modules (572, 574), exhaust gas from the thermal engines can alternatively be guided via conduit section 599 through the heat exchangers (591, 593) to heat-up circulating air from the dryer tunnel 505 or via conduit section 601 directly into the dryer tunnel 505.

The thermal engine 575 is arranged in a module 603 for the heating-up of fresh air, which can be brought into the drying tunnel 505 via a conduit system 605. Within the module 603, a generator 585 and a fan 592 are provided. The fan 592 and the generator 585 are movably coupled to the thermal engine with drive shafts (594, 596). With the fan 592, fresh air can be drawn in and guided into the drying tunnel 505. For the heating-up of the drawn-in fresh air, the fan 592 is connected to a heat exchanger 607. The heat exchanger 607, in turn, is connected via conduit section 609 to the thermal engine 575. The exhaust gas from the thermal engine 575 can therefore be guided via conduit section 609 through the heat exchanger 607 into the environment. Thereby, heat from the exhaust gas of the thermal engine 575 can be transferred to the fresh air provided to the drying tunnel 505.

The thermal engines (571, 573, 575) of the system 501 have respective cooling cycles which are not depicted in FIG. 5. These cooling cycles serve for the cooling of the combustion chambers in the thermal engines (571, 573, 575). With the heat from the thermal engines (571, 573, 575) released from the cooling cycle, heat consumers in a low-temperature range, which are not shown in FIG. 5, can be provided with heat.

The generators (581, 583, 585) arranged in the hot-box modules (572, 574) and the module 603 for the heating-up of fresh air produce electrical energy that is conducted via electrical connections 611 to the distribution module 549 of the system 501.

In summary, the following preferred features are particularly to be noted: a system 1 for the heating-up and/or drying of vehicle bodies 3 comprises a cabin 5. It includes a heating system (19, 27) for the heating-up of intake air for the cabin 5. Within the system 1, there is a consumer of mechanical energy, for example a generator 45 or a fan (21, 29). The heating system comprises at least one heat exchanger (19, 27). The heat exchanger (19, 27) can be charged with the hot exhaust gas of a thermal engine 25. The thermal engine 25 is movably coupled to the consumer of mechanical energy 45. Due to this movable coupling, mechanical energy can be transferred from the thermal engine 25 to the consumer 45.

It is understood that the foregoing description is that of the preferred embodiments of the invention and that various changes and modifications may be made thereto without departing from the spirit and scope of the invention as defined in the appended claims.

What is claimed is:

1. A drying system comprising:
    a temperature-controllable drying cabin for heating-up workpieces and discharging exhaust gas;
    a heating arrangement for heating-up intake air supplied to said drying cabin;
    a consumer;
    a thermal engine generating hot exhaust gas during operation thereof and being movably coupled to said consumer for transmitting mechanical energy from said thermal engine to said consumer;
    said heating arrangement including a heat exchanger charged with said hot exhaust gas of said thermal engine and being adapted to draw heat from said hot exhaust gas to heat said intake air supplied to said drying cabin;
    a spray booth for applying spray paint to workpieces;
    said spray booth having an extraction system including a fan for drawing exhaust gas charged with hydrocarbons from said spray booth;
    a supply source for supplying combustion gas from outside of said system;
    a mixing chamber operatively connected to said supply source, said spray booth and said drying cabin for receiving and mixing said combustion gas, said exhaust gas from said spray booth and/or said exhaust gas from said drying cabin; and,
    said thermal engine being connected to said mixing chamber to generate said hot exhaust gas from said combustion gas, said exhaust gas from said spray booth and/or said exhaust gas from said drying cabin.

2. The drying system of claim 1, further comprising a plurality of controllable valves which can be adjusted to facilitate mixing said exhaust gas from said drying cabin, said exhaust gas from said spray booth and/or said combustion gas in said mixing chamber.

3. The drying system of claim 1, further comprising an exhaust gas conduit connecting said mixing chamber to said drying cabin; a gas reservoir mounted in said exhaust gas conduit; and, a compressor for injecting said exhaust gas into said reservoir.

4. The drying system of claim 1, further comprising a conduit system connecting said spray booth to said mixing chamber; and, said conduit system including a gas reservoir into which said exhaust gas is fed via said fan.

5. The drying system of claim 1, wherein the thermal engine is formed as a gas turbine or gas motor.

6. The drying system of claim 1, wherein the workpieces are vehicle bodies.

7. The drying system of claim 1, wherein said exhaust gas flow from said spray booth and said exhaust gas flow from said drying cabin are different from each other with respect to flow rate and temperature.

8. The drying system of claim 1, wherein the exhaust gas flow at a higher temperature has a lower flow rate compared to another exhaust gas flow.

9. The drying system of claim 1, wherein said exhaust gas flow from said drying cabin is at a higher temperature and a lower flow rate compared to said exhaust gas flow from said spray booth.

10. The drying system of claim 1, wherein a flow rate of the exhaust gas flow from said spray booth lies between 50.000 $m^3N/h$ and 2.000.000 $m^3N/h$, and a flow rate of the exhaust gas flow from said drying cabin lies between 2.000 $m^3N/h$ and 20.000 $m^3N/h$.

11. The drying system of claim 1, wherein a temperature of the exhaust gas flow from said spray booth lies between 20° C. and 40° C., and a temperature of the exhaust gas flow from said drying cabin lies between 60° C. and 250° C.

12. A method for operating a system comprising a temperature-controllable drying cabin for heating-up workpieces, the method comprising:
    providing a heating system for heating-up of intake air for the drying cabin and a thermal engine, which is movably coupled to a consumer of mechanical energy;
    transferring mechanical energy from the thermal engine to the consumer, wherein the heating system comprises at least one heat exchanger charged with a hot exhaust gas of the thermal engine, wherein the heat exchanger removes heat from the hot exhaust gas to heat-up intake air supplied to the drying cabin;
    mixing the exhaust gas from the drying cabin and the exhaust gas from a spray booth, which is polluted with hydrocarbons, to form a mixture; and
    providing the mixture to the thermal engine for combustion.

13. The drying method of claim 12, wherein the workpieces are vehicle bodies.

* * * * *